United States Patent [19]
Mark et al.

[11] Patent Number: 5,595,238
[45] Date of Patent: Jan. 21, 1997

[54] ROTATABLY SUPPORTED REGENERATIVE FLUID TREATMENT WHEEL ASSEMBLIES

[75] Inventors: Henry Y. Mark, Philadelphia; James A. Heywood, Yardley, both of Pa.

[73] Assignee: Engelhard/ICC, Philadelphia, Pa.

[21] Appl. No.: 307,134

[22] Filed: Sep. 16, 1994

[51] Int. Cl.⁶ ............................................. F23L 15/02
[52] U.S. Cl. ..................................... 165/9; 165/8
[58] Field of Search ..................... 62/271; 165/9, 165/8; 277/166, 189, 223, 229

[56] References Cited

U.S. PATENT DOCUMENTS

| | | |
|---|---|---|
| 1,215,222 | 2/1917 | Van Calcar, et al. ............... 95/118 |
| 2,926,502 | 3/1960 | Munters et al. ..................... 62/94 |
| 3,167,115 | 1/1965 | Chute .............................. 165/8 X |
| 3,391,727 | 7/1968 | Topouzian ......................... 165/9 |
| 3,400,954 | 9/1968 | Brown ............................ 277/166 |
| 3,622,737 | 11/1971 | Trudeau ........................... 165/9 |
| 3,666,000 | 5/1972 | Blech et al. ...................... 165/8 |
| 3,789,917 | 2/1974 | Jarry .............................. 165/8 |
| 3,856,077 | 12/1974 | Siegla ............................. 165/9 |
| 3,907,310 | 9/1975 | Dufour ........................... 165/9 X |
| 3,913,662 | 10/1975 | Davis .............................. 165/8 |
| 3,931,852 | 1/1976 | Rao ................................ 165/9 |
| 3,957,106 | 5/1976 | Whitfield ......................... 165/9 |
| 3,965,695 | 6/1976 | Rush et al. ....................... 62/271 |
| 4,024,906 | 5/1977 | Bramley ........................... 62/94 |
| 4,093,435 | 6/1978 | Marron et al. ..................... 55/269 |
| 4,176,523 | 12/1979 | Rousseau ....................... 62/271 X |
| 4,187,900 | 2/1980 | Pereira et al. .................... 165/8 |
| 4,188,993 | 2/1980 | Heyn et al. ....................... 165/8 |
| 4,212,472 | 7/1980 | Mizuno et al. .................. 165/9 X |
| 4,228,847 | 10/1980 | Lindahl ........................... 165/10 |
| 4,255,171 | 3/1981 | Dravnieks ........................ 55/269 |
| 4,328,857 | 5/1982 | Noll et al. ........................ 165/8 |
| 4,399,863 | 8/1983 | Banasiuk ....................... 62/271 X |
| 4,594,860 | 6/1986 | Coellner et al. .................. 62/271 |
| 4,597,583 | 7/1986 | Inciong et al. ................ 277/166 X |
| 4,924,934 | 5/1990 | Steele ............................. 165/8 |
| 5,148,374 | 9/1992 | Coellner ......................... 364/505 |

FOREIGN PATENT DOCUMENTS

| | | | |
|---|---|---|---|
| 0084090 | 5/1984 | Japan .............................. 165/9 |
| 763385 | 12/1956 | United Kingdom ............... 165/9 |
| 863901 | 3/1961 | United Kingdom ............... 165/9 |
| 2064084 | 5/1981 | United Kingdom ............... 165/9 |

OTHER PUBLICATIONS

Kays, W. M.; London, A. L. *Compact Heat Exchangers*, 3rd., McGraw–Hill Book Company, 1984, pp. 186–188, 279.

Primary Examiner—John Rivell
Assistant Examiner—Christopher Atkinson
Attorney, Agent, or Firm—Panitch, Schwarze, Jacobs & Nadel, P.C.

[57] ABSTRACT

Rotatably supported, regenerative fluid treatment wheel assemblies include a wheel with circumferential rim and track, a housing in which the wheel is disposed and a plurality of rollers disposed within the housing in rolling engagement with the track to locate a wheel axially and radially within the housing. Seal flanges are provided projecting radially outwardly from the rim and are opposed by flexible seals which are clip mounted to walls of the housing surrounding openings through those walls which are aligned with the wheel. At least one wheel is preferably spring loaded so to compensate for any eccentricity in the wheel. The wheel is belt driven. A subassembly, including a mounting plate, flange-mounted motor, drive pulley and spring loaded idler pulley is provided for easy installation and removal. Wear strips appropriate for contact with either the seal flanges or face of the wheel core are applied to the flexible seals by pressure sensitive adhesive. Roller support and location can be applied to hub and spoke wheels as well. Rollers support and location permits the use of a smaller hub and a single bearing, thereby minimizing the center area of the core lost to fluid treatment.

13 Claims, 6 Drawing Sheets

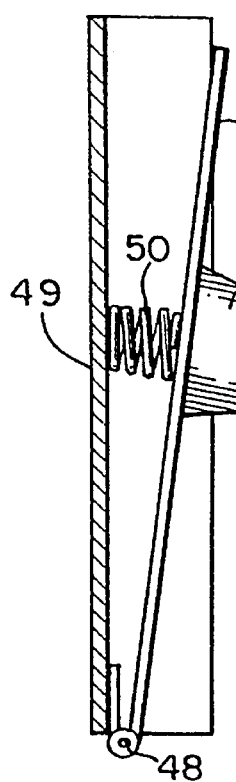
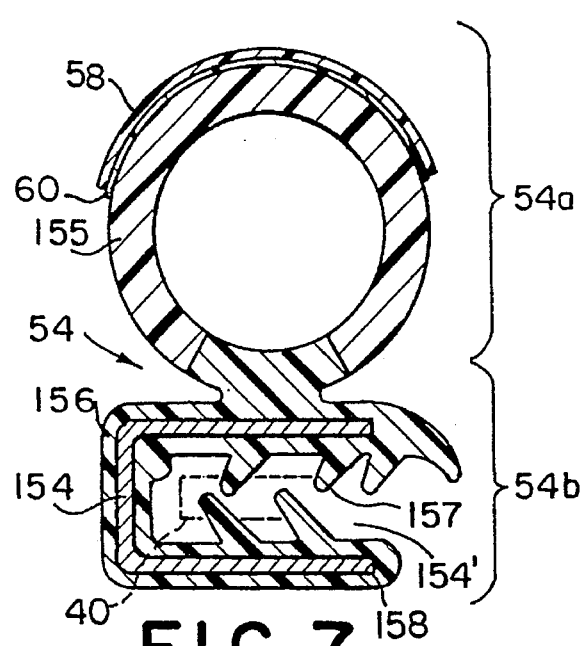
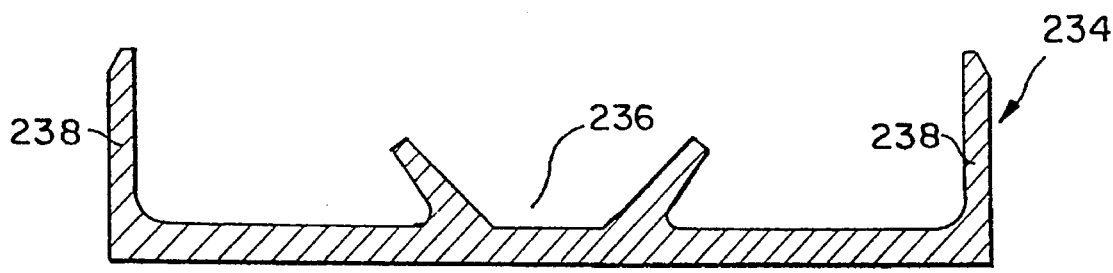
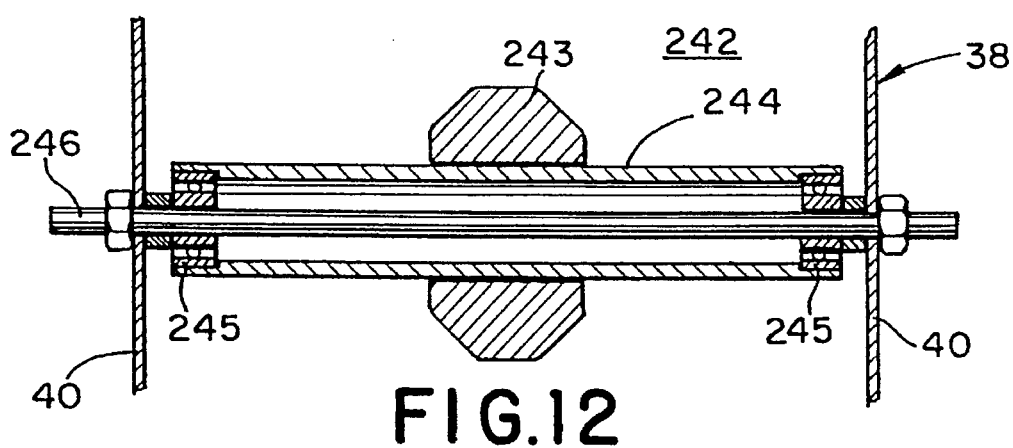

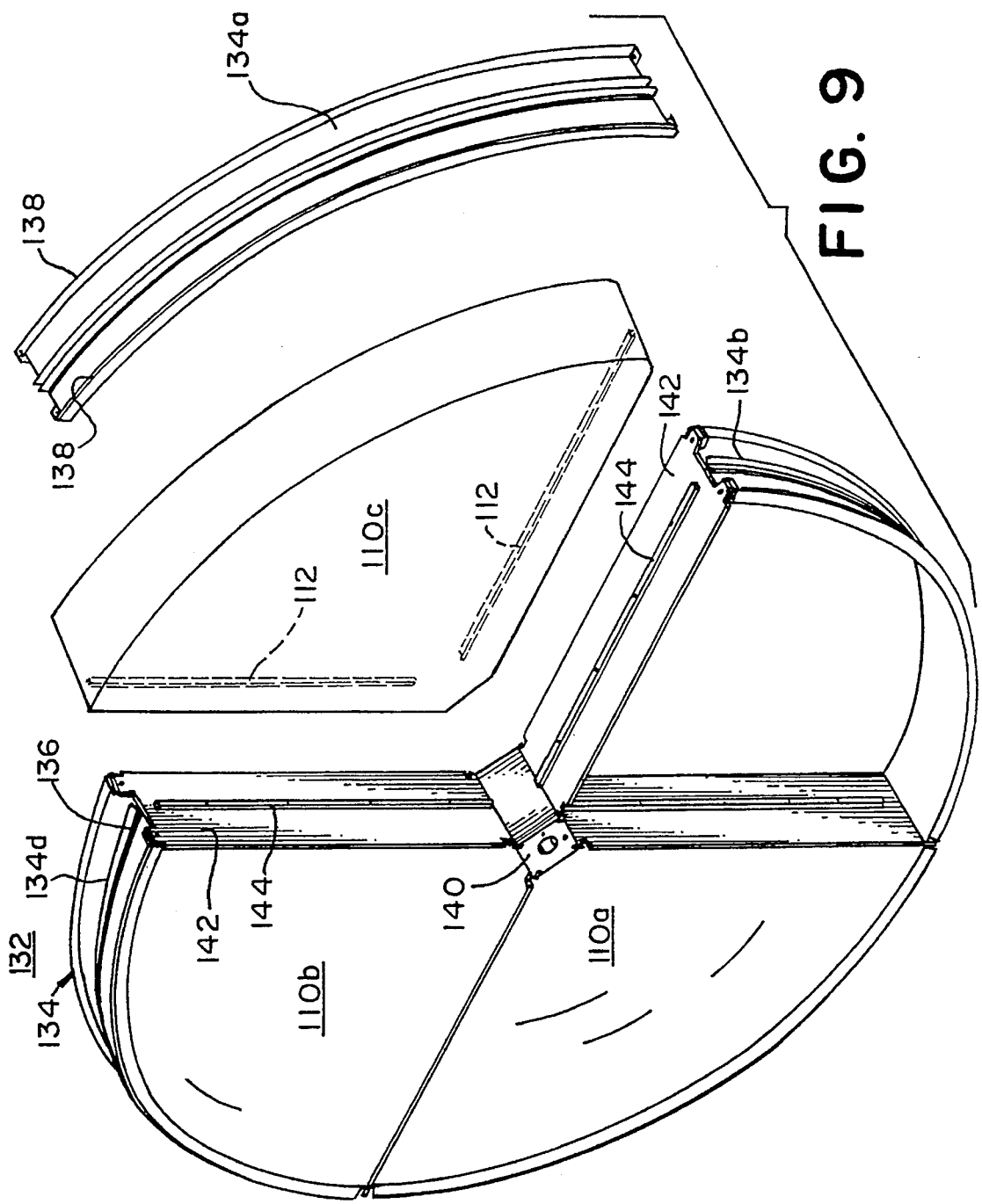

ROTATABLY SUPPORTED REGENERATIVE FLUID TREATMENT WHEEL ASSEMBLIES

FIELD OF THE INVENTION

The present invention relates to regenerative fluid treatment wheels and to assemblies rotatably supporting such wheels.

BACKGROUND OF THE INVENTION

Regenerative type periodic flow devices are conventionally employed to expose fluid streams to constituents or to transfer heat or constituents from one fluid stream to another, and thereby from one area or zone in space to another. Such device might be used to achieve one of heat transfer, mass transfer, catalysis, ion exchange, separation of the fluid media, removal of organic compounds from the fluid media, dilution or concentration of fluid components, treatment of fluid-carrying organisms, and the capture and retention of hazardous materials. Typically, these devices are in the form of a "wheel". The direct contact of the stream to the constituents or the transfer of heat or constituents from one fluid stream to another is then accomplished as the wheel rotates.

The one common type of wheel is around a cylindrical hub and applying commonly constructed by wrapping a corrugated material around a cylindrical hub and applying a rim around the wrapped core. The wrapped core is further held in place by extending spokes radially through the core between the hub and the rim.

Wheels of such construction are used in cycle air-conditioners, which are known in the art and are based primarily on the Munters Environmental Control system (MEC) unit as described in U.S. Pat. No. 2,926,502. As set forth in this patent, the basic open-cycle air-conditioner operates by dehumidification and subsequent cooling of air wherein moist hot air is conditioned by basically a multi-stage process to produce cool air.

In open-cycle air-conditioning systems, a basic multistep approach is used. This is shown, for example, in Coellner et al. U.S. Pat. No. 4,594,860. In the inlet path, outside air is subjected to removal of moisture through a moisture transfer wheel, with the dried air being cooled by means of a heat exchanger wheel with the subsequent addition of moisture by an evaporative element so as to further cool the air before it enters the area to be conditioned. In the return cycle, the air passes through an exhaust path which includes a further evaporative element, the heat exchanger wheel, a heating element, and the moisture transfer wheel, after which the air is exhausted to the atmosphere. In the return cycle, also called the outlet path, air passing through the moisture transfer wheel accomplishes the regeneration of the wheel by driving moisture therefrom.

The mechanical subsystems which envelop the core section of each wheel are extremely critical to the operation and longevity of the assembly, particularly the core. The factors important to the core include: (1) the mechanical system used to effectively seal one fluid stream from another, (2) alignment of the core with respect to the mechanical sealing system, (3) the means used to maintain the structural integrity of the wheel including the core, (4) the means used to support and rotate the wheel, and (5) the means by which the various subsystems are combined to house the core in a modular assembly, typically referred to as a "cassette".

SUMMARY OF THE INVENTION

In one aspect, the invention is a rotatably supported regenerative fluid treatment wheel assembly comprising: a regenerative fluid treatment wheel having a core porous in an axial direction and a circular rim surrounding and secured with the core; a track on the treatment wheel encircling the treatment wheel; a housing surrounding the treatment wheel; and a plurality of rollers disposed in the housing in rolling engagement with the track.

In another aspect, the invention is a rotatably supported regenerative fluid treatment wheel assembly comprising: a regenerative fluid treatment wheel having a core porous in an axial direction; a pair of seal flanges extending at least generally outwardly from the treatment wheel around the outer circumference of the treatment wheel proximal each of two major opposing axial faces of the wheel; a housing surrounding the air treatment wheel, the housing including a pair of opposing outer walls with openings therethrough at least generally axially aligned with the core of the treatment wheel; and flexible seals releasably clipped on the housing surrounding each opening, each seal positioned to contact one of the seal flanges of the treatment wheel.

BRIEF DESCRIPTION OF THE DRAWINGS

The foregoing summary, as well as the following detailed description of the preferred embodiment of the invention, will be better understood when read in conjunction with the appended drawings. For the purpose of illustrating the invention, there is shown in the drawing an embodiment which is presently preferred. It should be understood, however, that the invention is not limited to the precise arrangements and instrumentalities shown. In the drawings:

FIG. 6 is a side elevation of a pivotally supported roller of the regenerative fluid treatment wheel assembly;

FIG. 7 is a cross-sectional elevation of a clip secured flexible seal;

FIG. 9 is a schematic, partially exploded view of an alternate regenerative fluid treatment wheel construction;

FIGS. 10 and 11 are cross-sectional view of alternate rim profiles;

FIG. 12 is a cross-sectional elevation of another roller embodiment;

DETAILED DESCRIPTION OF THE PREFERRED EMBODIMENTS

Certain terminology is used in the following description for convenience only and is not limiting.

Figure 1:
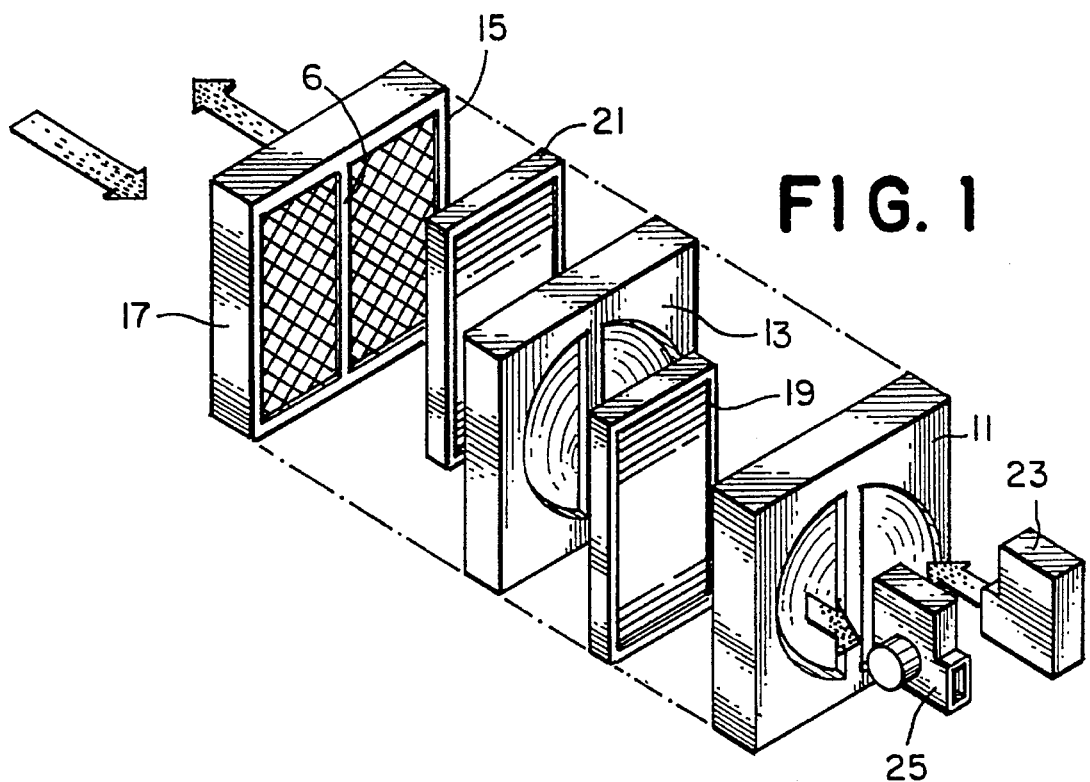
FIG. 1 is a schematic view of an open-cycle air conditioning system utilizing rotatably supported, regenerative fluid treatment wheel assemblies in accordance with the present invention.

Turning now to the drawings, FIG. 1 illustrates schematically of a basic open-cycle air-conditioning system in which rotatably supported regenerative fluid treatment wheel assemblies of the present invention may be utilized. A moisture transfer wheel assembly 11 constitutes the exterior or outside element of the system. The assembly 11 is separated into two sections so as to provide an intake path and an exhaust path through the assembly 11, as indicated by the arrows. A heat exchanger wheel assembly 13, also partitioned so as to provide intake and exhaust paths is located substantially adjacent to the moisture transfer wheel assembly 11, separated only by a solar heat regeneration coil 19. Auxiliary solar heating coil 21 may be placed in the system for use in cold months when it is desirable to heat the interior of the area rather than to cool it. The solar coils include fluid pipes which are interconnected with standard solar heating units (not shown). The basic unit terminates in a pair of evaporator elements 15 and 17 separated by a partition 6 with the arrows indicating the intake air into the building and the air exhausting therefrom. A supply blower 23 and a exhaust blower 25 are provided so as to implement the necessary air movement within the system. This particular open-cycle air conditioner system is disclosed in U.S. Pat. No. 4,594,860, the entire disclosure of which is hereby incorporated herein by reference. Accordingly, further description of the structure of the open-cycle air conditioner system is omitted for purposes of brevity only and is not limiting.

As is well known, this type of system provides removal of the moisture from the intake air by the moisture transfer wheel assembly 11. When moisture is removed from the air, the temperature of the air increases. The air is subsequently cooled upon passing through heat exchanger wheel assembly 13, which lowers the temperature of the warm dry air. Evaporator element 15 adds moisture to the air, thus reducing the temperature further and supplying cool air to the conditioned area. The exhaust air passes through evaporator element 17 and through heat exchanger wheel assembly 13 so as to remove heat from the heat exchanger and raise the temperature of the exhaust air. The temperature of the exhaust air is further raised by means of the solar heating element 19 so as to provide high temperature air in the exhaust path resulting in regeneration of the moisture transfer wheel assembly 11. The air from the moisture transfer wheel assembly 11 is exhausted into the atmosphere.

Figure 2:
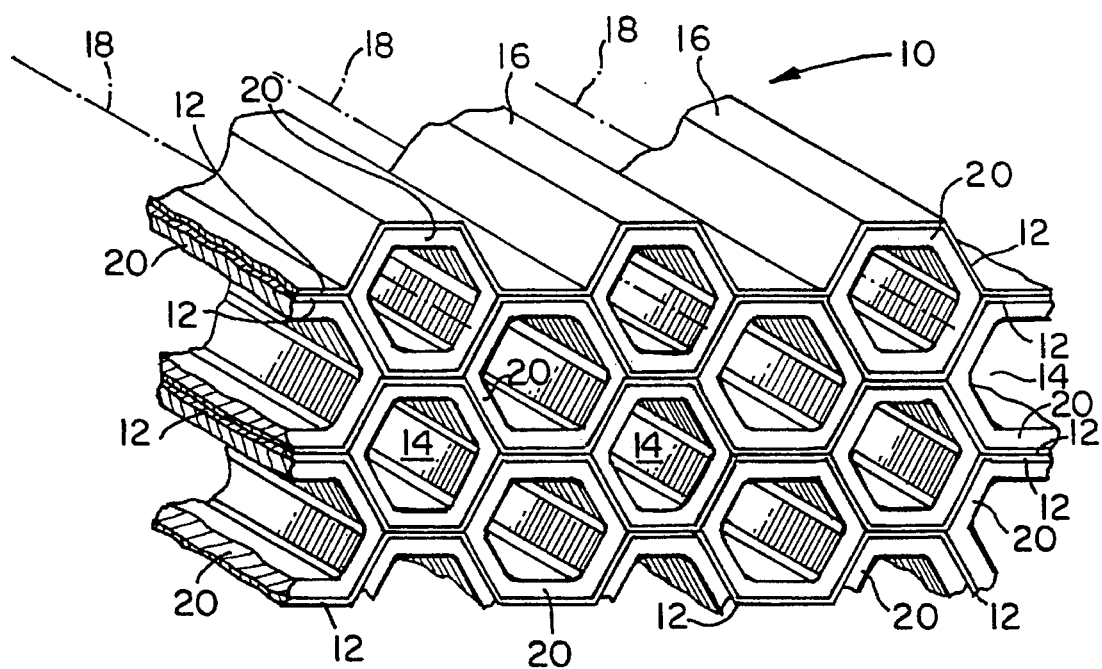
FIG. 2 is a greatly enlarged cross-sectional view of a core of a regenerative fluid treatment wheel used in the system shown in FIG. 1.
Figure 3:
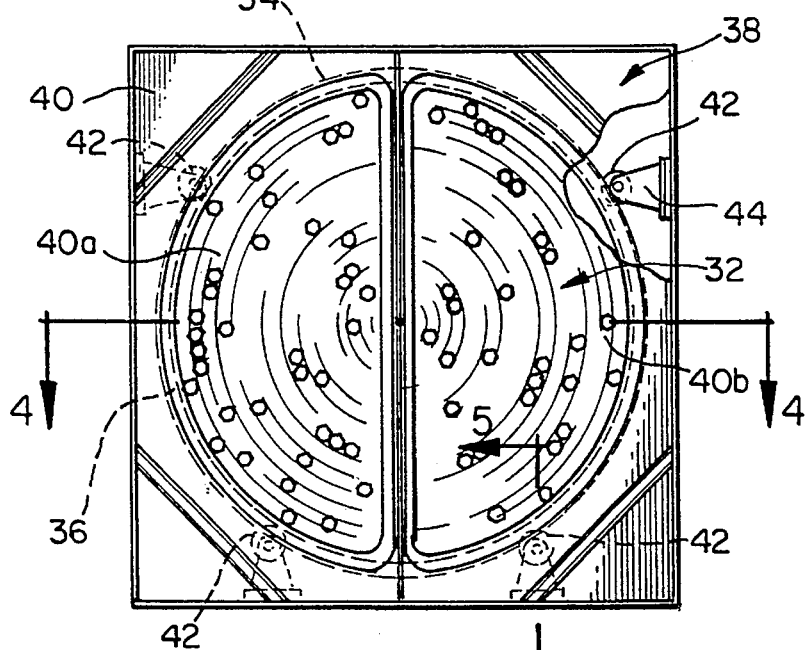
FIG. 3 is an enlarged front elevational view of the regenerative fluid treatment wheel assembly.
Figure 4:
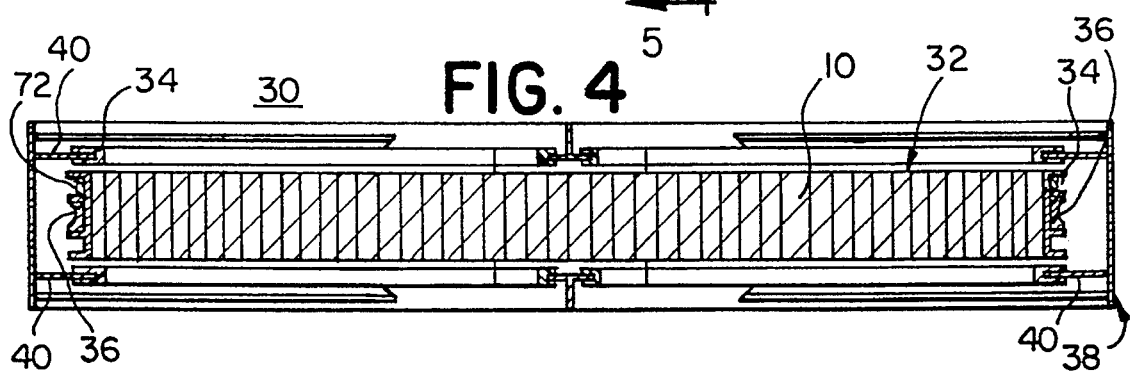
FIG. 4 is an enlarged cross-sectional view of the regenerative fluid treatment wheel assembly shown in FIG. 3 taken along lines 4—4 of FIG. 3.
Figure 5:
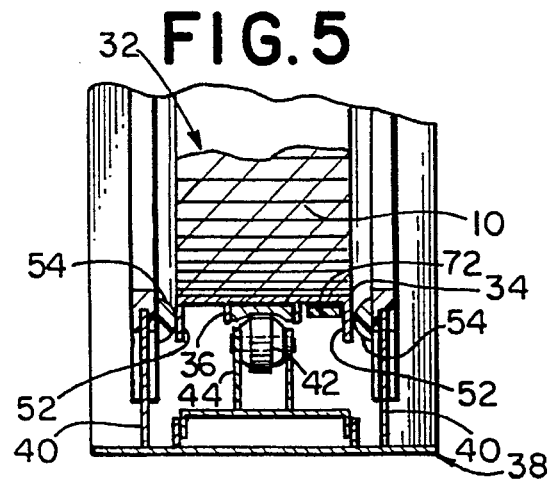
FIG. 5 is an enlarged cross-sectional view of the regenerative fluid treatment wheel assembly shown in FIG. 3 taken along lines 5—5 of FIG. 3.

FIG. 3 illustrates the construction of a generic regenerative fluid treatment wheel assembly 30 of the present invention, which comprises a regenerative fluid treatment wheel 32 and a housing 38. As is illustrated in FIGS. 4 and 5, the wheel 32 comprises a core 10 and a rim 34. Referring to FIG. 2, the core 10 is porous in an axial direction and comprised of a plurality of adjoining parallel channels 14, which extend axially through the core 10. According to a preferred embodiment of the core 10, each of the channels 14 is generally in the form of a hexagon in cross section and includes an internal surface area 16. It is also preferred that the channels 14 be formed from a plurality of stacked layers of material 12. The layers of material 12 of the channels 14 have a minimum thickness to inhibit the effect of the wall thickness increasing the pressure drop through the core 10 and yet provide the core 10 with sufficient structural integrity to be self supporting. It is understood by those skilled in the art that the exact thickness of the walls formed by the layers of material 12 could vary, depending upon the particular application of the core 10 and existing manufacturing techniques, without departing from the spirit and scope of the invention.

Each of the channels 14 includes a centrally disposed longitudinal axis 18. The channels 14 are preferably sized such that a distance between and along longitudinal axes of adjacent channels is generally uniform (i.e., the adjacent channels 14 are equidistantly spaced from each other and extend generally parallel with respect to each other). It is preferred that channels 14 of the present invention, due to their hexagonal cross-sectional configuration, be closely adjoined to increase the available transfer surface per unit of volume.

The use of channels having a cross section which is generally in the form of a hexagon is advantageous over other geometries, including, but not limited to sinusoidal, square, and triangular. The theoretical available transfer surface area (i.e., based upon standard measurements and calculations of the geometries prior to coating the interactive material) of a hexagon is greater than the transfer surface area of a sinusoidal, triangle or square for a given volume.

While in the present invention it is preferred that the channels 14 be configured to be generally in the form of a hexagon in cross section, it is understood by those skilled in the art that the cross section of the channels could be other straight-sided shapes with equal angles and equal side lengths, such that the cross section approaches a circle, and which permit the channels to be closely adjoined to maximize the greatest transfer surface area per unit volume without departing from the spirit and scope of the invention. Although it is also understood by those skilled in the art that other geometries could be used, such as, triangle, square, sinusoidal, so long as the operating parameters described below are attained, without departing from the scope and spirit of the invention.

Referring back to FIGS. 3 through 5, there is shown a first preferred embodiment regenerative treatment wheel assembly of the present invention indicated generally at 30, which by suitable selection of the core 10, might be either a moisture treatment wheel assembly 11, heat exchanger wheel assembly 13 or any of a variety of other known types of regenerative wheels.

For smaller regenerative wheels, the layers of material 12 which form the channels 14 of the core 10 can provide the core 10 with sufficient structural integrity to avoid the requirement of a hub assembly and spokes. Thus, in the preferred embodiment 30 shown in FIG. 3, there is no hub spokes in the transfer wheel 32.

A track 36 of any configuration is provided on the transfer wheel 32, encircling the wheel 32 along its outer circumference. Preferably the track 36 is integral with the rim 34 and is formed in one piece with the rim, by extrusion or molding, for example. The track 36 is defined by a pair of mirror image flanges, which extend generally radially outwardly from the external surface of the rim to define a channel, which is preferably centered axially on the rim. The track 36 allows the wheel 32 to be supported at its periphery and rotatably mounted within the housing 38, as shown in FIG. 3. The housing 38 is generally in the form of a parallelepiped and includes a pair of major opposing sides 40 with a pair of semi-circular openings 40a and 40b on each side 40 to divide the fluid flows passed through the wheel 32. This allows the wheel 32 to be placed in a desiccant air-conditioning system of the type described in U.S. Pat. No. 4,594,860, incorporated by reference herein in its entirety.

A plurality of rollers or "support wheels" 42 are disposed within the housing 38 in rolling engagement with the track 36. The support wheels 42 are positioned to rotatably support the wheel 32 in the housing 38 such that the core 10 of the wheel 32 is in alignment or registry with the semi-circular openings 40a and 40b. Desirably, at least three and, preferably, at least four support wheels 42, 44 are provided. In the embodiment shown, two of the wheels 42 are located relatively closely together near the bottom of the regenerative wheel 32 and equally support its weight. The remaining two wheels 42 are preferably located equidistant from one another and from the closer of the bottom two support wheels 42 to fully surround the transfer wheel 32 and thereby locate the wheel 32 both axially and radially within the assembly 30. As a result of this rim located axial support, the regenerative wheel no longer needs to be flat and true. It now merely needs to be flat. Three of the support wheels 42 are supported within the housing 38 as shown in FIG. 5 by a generally T-shaped support member 44, which rotatably supports the support wheel 42. One of the four support wheels 42, preferably one of the two upper wheels, is supported for movement towards and away from the track 36. Instead of being fixedly coupled to the housing 38, the support member 44 of the fourth wheel is preferably mounted on a plate 46 coupled at one end by a hinge 48 or other pivotal coupling to a mounting plate 49 coupled with the housing 38 as shown in FIG. 6. A bias member 50, preferably in the form of a coil spring, is coupled with that one support wheel 42 and the housing 38 so as to bias that one support wheel 42 towards the track 36. The force provided by the bias member 50 is designed to be sufficient to overcome any defection caused by the seals, air or other displacive forces. This one movable, biased support wheel is significant to the invention in that it adjusts and compensates for eccentricities in the regenerative transfer wheel 32.

The plurality of support wheels 42 are preferably also located in a single plane passing through the center of the regenerative wheel 32 perpendicular to its central axis to uniformly distribute the weight of the regenerative wheel on the support wheels 32. It is appreciated that the present invention allows the regenerative wheel 32 to be located completely in the axial and radial directions without the use of a center hub or seals for alignment. It should further be appreciated that the support wheels 42 further allow for the easy and insertion and removal of the regenerative wheel 32 for seal maintenance as well as allowing the seal force to be significantly lower. The regenerative wheel 32 is further preferably provided with a pair of mirror image seal flanges 52, which extend outwardly, preferably radially, from the regenerative treatment wheel 32 around the circumference of that wheel 32, proximal each of the two major opposing axial faces of that wheel 32. Preferably the seal flanges 52 are integral with the rim 34 and formed in one piece with the rim 34 and the track 36.

As can be seen in FIG. 5 flexible seals 54 are mounted on the housing 38 surrounding each of the semicircular openings 40a, 40b. Seals 54 are positioned to contact the seal flanges 52 of the treatment wheel 32 as shown in FIGS. 4 and 5, substantially and preferably at least essentially entirely around the treatment wheel thereby preventing fluid flow losses. Preferably, each of the seals 54 is releasably clipped to an edge of one of the pair of opposing outer walls 40, which define each of the openings 40a, 40b.

A currently preferred flexible seal configuration is depicted in cross-section in FIG. 7. The preferred seal 54 includes a generally bulbous, hollow portion 54a integral with a more resiliently flexible clip portion 54b. The clip portion 54b preferably includes a more resilient "C" channel member 154, which defines an open channel 154'. The elastomer 155 of portion 54a and the channel member 154 are preferably joined together by a flexible polymeric plastic 156, which surrounds the channel member 154 and defines a plurality of flexible engagement fingers 157, which extend into channel member 154. The configuration of the clip portion 54b allows that portion to be releasably clipped directly to an edge of the outer wall in phantom 40 defining either of the openings 40a, 40b. If desired, additional means such as a releasably pressure sensitive adhesive may be provided to more securely yet still releasably clip the seal 54 to the outer wall 40. Alternatively, a seal without a clip could be secured directly to the outer wall 40 with a suitable epoxy or pressure sensitive adhesive. The seals 54 may be molded in a "D" shape or could be provided as a continuous member which is extended around and cut to fit about each opening 40a, 40b.

The extreme distal end of the bulbus portion 54a of each seal 54, which extends around the curved portion of the opening 40a, 40b, contacts one of the seal flanges 52 of the regenerative transfer wheel 32. The portion of the seal 54, which extends diametrically across the wheel 32, defines the air partition between adjoining halves of the wheel 32 and contacts the exposed end surface of the core 10. Preferably, a wear tape 58 is applied to the extreme distal end of the bulbus portion 54a of each seal 54 to prevent excessive wear of the seal and protect the underlying elastomer. The wear tape 58 may be affixed to the seal 54 by various means, preferably a layer of an appropriately selected adhesive 60.

The above described clip mounted seals 54 save manufacturing and repair costs as the seals 54 can be more quickly installed and removed than could prior seals, which were fixedly secured to the housing by removable fasteners such as screws or nuts and bolts.

Figure 8:
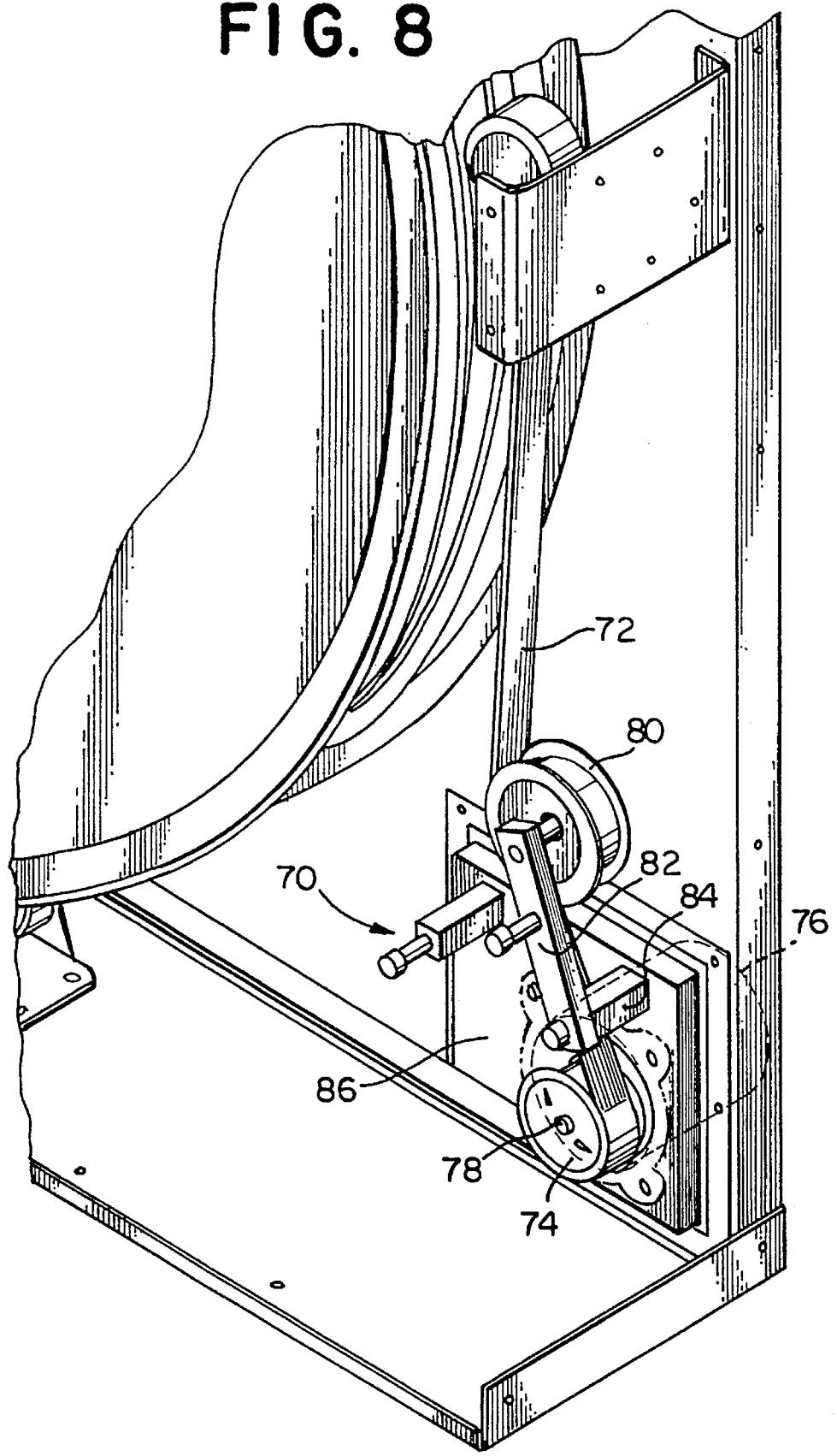
FIG. 8 is a schematic perspective view of a drive subassembly of the regenerative fluid treatment wheel assembly.

A drive mechanism is provided as part of the assembly and drivingly engages the exterior of the rim 34 to rotate the wheel 32 with respect to the housing 38. The major components of the drive mechanism are depicted schematically in FIG. 8 and indicated generally at 70. Drive mechanism 70 includes a flexible member 72, preferably a belt, which encircles the regenerative treatment wheel 32 in driving engagement with the wheel 32, specifically the rim 34 of the wheel. Drive mechanism 70 further include a drive member 74 within the housing 38 in driving engagement with the flexible member 72 and a prime mover 76 in driving engagement with the drive member 74. Preferably the prime mover 76 is a flange mounted electric motor having a drive shaft 78, which is rotationally engaged with the drive member 74. The drive member 74 is preferably a pulley. Preferably an idler pulley 80 also is provided on an arm 82 rotatably mounted to a post 84 extending from a mounting plate 86. Preferably, the prime mover 76 is flange mounted to the outer side of the mounting plate 86 with the drive shaft 78 extending through the mounting plate 86 into driving engagement with the drive member 74. The mounting plate 86 fits over an opening provided through one of the two major opposing outer walls 40 to one side of the wheel 32 and is removably secured to that wall 40 by conventional means such as screws or bolts. This construction permits the easy removal and installation of the entire drive mechanism 70, apart from the flexible member 72, as a sub-assembly for simplified construction, ease of maintenance and repair and ease of sealing of the housing 38, on which the drive mechanism is mounted. In the past when motors were required that were larger in size then could be accommodated within the housing, a sub-housing was built around such motor where it was mounted to the housing or through the housing. The present invention permits the use of a plate, which is easily installed and sealed along its four sides, in place of the more detailed construction of an entire, multi-sided sub-housing. The motor 76 is conventionally supplied with an internal shaft seal which prevents fluid leakage through the motor. Sealing the motor to the plate around the flange completes the assembly seal at the drive mechanism.

Fabrication of the core is described in detail in related U.S. patent application Ser. No. 08/246,548, filed May 20, 1994 incorporated by reference therein. As an example of the invention, it is preferred that the layers of material 12 for a moisture transfer wheel 11 or heat transfer wheel 13 be comprised of a non-metallic, high-strength, temperature-resistant, low thermal conductivity material, such as Nomex® aramid in paper form. The process of assembling the layers of material 12 in the form of the channels 14 is well understood by those skilled in the art. Where the regenerative wheel assembly 30 is used to dehumidify air, Aeroweb® HMX-20 aramid honeycomb without resilient resin coating, manufactured by CIBA Composites of Anaheim, Calif., division of CIBA Geigy Corp. of Ardsley, N.Y. may be used as the material of the walls 12, which are preferably coated with a crystalline titanium silicate molecular sieve zeolite compound manufactured by Engelhard Corp. of Edison, N.J. under the name ETS and disclosed in U.S. Pat. No. 4,853,202, which is hereby incorporated by reference. Uncoated Aeroweb® HMX-20 is also preferred for the core where the wheel is used for heat transfer in a desiccant air conditioning system. However, it is understood by those skilled in the art that the layers of material 12 and the manner in which they are formed are not pertinent to the present invention, and that other materials, such as kraft paper, nylon fiber paper, mineral fiber paper and the like could be used to construct the layers of material 12 and that other methods could be used to form the hexagonal channels 14, such as extrusion, machining or molding, without departing from the spirit and scope of the invention.

It is preferred that the thickness also the core be formed from stacked layers 12 of the Aeroweb® material, each having a thickness of about 0.0015", although the thickness of the walls formed by joined layers of material could be in the range of about 0.001 to 0.006". It is further preferred that the spacing between immediately adjoining pairs of longitudinal axes 18 of the channels 14 in the range of about 0.050 to 0.125".

To form a wheel 32, a circle is trimmed from a piece of core material, which is larger than the diameter of the wheel, using a cutting device such as a band saw, after what will be the center of the core is rotatably mounted on a support adjoining the saw. The present invention is not limited to the use of the preferred Aeroweb® or other aramid material.

Other materials such as Kraft paper, nylon fiber paper, mineral fiber paper and the like could be used to construct the core of the wheel used for moisture transfer of heat exchange. Again, still other materials could be used.

Preferably, the rim 34 is formed from an extrusion including, with the material defining the rim, the projections defining the track 36 and the seal flanges 52, in one straight piece. The straight piece is preferably cut to size, bent to form a circle and welded or otherwise mechanically fastened to itself. Automotive wheel turning equipment might be used to bend the extrusion. The preferred core 10 is preferably secured to the rim 34 by the use of adhesive, such as a conventional epoxy like Mavidon MF2000 A and B or possibly a foaming epoxy. Foaming epoxy is preferred as it will conform during curing to eccentricities which are present between the core and rim. However, the rim 34 could secure the core 10 solely by means of an interference or friction fit.

While aluminum is preferred for its high strength, light weight and ease of fabrication, other materials such as steel or polymeric materials could be used to construct the rim and might be necessary or desirable for other types of wheel uses and other types of core materials. Extrusion permits the rim and the various projections forming the track, sealing flange and any core engaging element(s) (if the rim is mechanically or frictionally secured with the core) to be formed in one piece in one step. Aluminum extrusion results in tighter rim and seal flange width tolerances than could be attained using traditional machining techniques, as well as providing a smooth exterior surface to the seal flange, which permits the flexible air seals 54 to be run along the flanges. In addition to extrusion, one piece rims with multiple projections can also be formed directly by casting or molding and can be formed in segments which are joined or one-piece. Though less desirable, the track and seal flanges could be added to a flat sheet stock mechanically or adhesively or the desired rim profile machined from conventional bar stock.

While the extrusion process provides seal flanges 52, which are sufficiently smooth to directly contact the seals, the seal flanges 52 could also be coated with even lower friction material(s) such as low friction graphite, Teflon® or molybdenum disulfide to further reduce the wear of the mechanical seals. These and other materials could can be applied by any of several different methods including painting, dipping or powder impregnation.

The opposing faces of the core 10 may be coated with an epoxy or a low viscosity casting compound to increase the durability of the exposed surface against damage as well as to further mechanically strengthen the core 10.

The bulbous portion 54a of the flexible seal 54 may be extruded from an elastomer 155 such as, for example, an EPDM (ethylene, propylene, diene monomers), silicone, neoprene, or urethane rubber and co-extruded with a plastic or metal channel member 154 and a flexible, polymer plastic material 158 or a natural or synthetic rubber in dip portion 54b. Alternatively, such portions 54a/54b can be separately made and subsequently assembled in a conventional fashion with an appropriate adhesive. Such seals can be obtained from various commercial suppliers as a stock automotive trim item. Part No. 75001616 of Standard Products Inc., Dearborn, Mich., can be used. This item is normally used as a static trim seal in automobiles. For the curved portions of the seals 54 which contact the seal flanges 52 of the regenerative wheel 32, the wear tape 58 is preferably a Furon Dixon Rulon XL tape with a pressure sensitive adhesive (3M stock number 9485-PC). For the portions of the seals 54 which extend diametrically across the face of the core 10, a Furon Dixon Rulon F tape with the same pressure sensitive adhesive can be used. An epoxy such as Mavidon 5110 A and B can be used if greater holding strength is desired with either tape. Also, this method of sealing may be used with other types of regenerative wheels including conventional hub supported and located wheels. The tapes are supplied in rolls with the pressure sensitive adhesive and are directly applied to the exposed bulbous portion 54a of each flexible seal 54. The pressure sensitive adhesive allows the tapes to be easily applied and securely held thereby reducing manufacturing costs, while enhancing the elastomeric characteristics of this seal as the bulbus portion 54a can be fully made of elastomer and need not be fully covered with the wear strip.

The flexible member 72 is preferably a timing belt having a toothed interior surface (not depicted) and the drive member 74 has a toothed exterior surface (also not depicted) engaging the teeth of the belt. Due to the more extensive surface of the wheel rim 34 contacted by the flexible member 72, it is not necessary to provide teeth on the wheel. However, teeth could be provided, if desired, and could be added to an extrusion by mechanical and/or adhesive fastening. In addition to belts, other types of flexible members may be used, depending upon a particular configuration of the assembly 30, including, but not limited to chain, elastic bands, V-belts, rubber coated cabling, etc. It is presently preferred to run the flexible member over the rim 34 between the track 36 and one of the two seal flanges 52 to avoid any interference with any of the support wheels 42. However, it would be possible and, in certain instances, perhaps desirable to run the flexible member 72 in the track 36.

The housing 38 may be made in a conventional fashion employing simply sheet metal panels with or without structural steel as needed. Preferably, the housing 38 is symmetric with respect to a vertical plane through the center of the regenerative wheel 32 such that pairs of identical panel members may be joined to one another and/or an internal frame to form each of the two major outer opposing walls 40 of the housing 38.

The present invention is most advantageously employed with regenerative fluid treatment wheels employing core material which are self-supporting for the size of the wheel fabricated. However, other advantages of the present invention can be achieved by its application to hub and spoke wheels as well. FIG. 9 depicts a partially exploded, regenerative fluid treatment wheel 132 having a rim 134 with a track 136 encircling the wheel 132 on the rim 134. Seal flanges 138 are provided projecting radially outwardly along the lateral circumferential edges of the rim 134. A hub assembly 140 is provided at the center of the wheel 132. A plurality of identical spokes 142 extend radially between the hub 140 and the rim 134. The spokes 142 are fixedly secured between adjoining segments 134a/134b and 134a/134d of the rim, for example by nut and bolt fasteners (not depicted) while an opposing end of each spoke 142 is received in an appropriate slot in the hub assembly or simply "hub" 140. The core of the wheel is provided by a plurality of substantially identical annular segments, two quarter-circle segments 110a and 110b being shown already installed and a third segment 110c being shown in a partially exploded view before installation. The core segments 110a–110c can be secured in the wheel 132 against movement in the axial direction in a variety of ways including adhesives, as indicated previously, and interference engagement as is illustrated by wheel 132. Each of the spokes 142 is provided with protruding, radially extending flanges 144 on either side of the spoke, which engage with slots or grooves cut into the long straight sides of each core segment 110a–110c, two grooves 112 of the segment 110c being shown in phantom. When the segment 110c is installed between the adjoining pair of spokes 142, each of the flanges 144 from the pair of adjoining spokes will project into engagement with the slots 112 provided on the opposing side of the core segment 110c. The core segment 110a–110c may be simply mechanically joined in this way to the spokes and rim or be further adhered, if desired, to further retain the core segments.

Preferably, the hub 140 is of a symmetric polygon configuration, a square configuration being depicted. This greatly simplifies cutting the small side wall of the core segments 110a–110c, which directly faces the hub and avoids the necessity of making a small radius cut along that portion of the core segment. Alternatively, a single elongated roller bearing (not depicted) might be provided within the hub 140, extending substantial the axial length of the hub 140, to rotatably support the wheel 132 on a fixed axle (not depicted) extended through the central axial opening shown in the hub assembly/40. The provision of surrounding support wheels (not depicted) engaged with the track 136 will eliminate the axial load on the hub bearing. It further eliminates the need to manufacture the regenerative wheel 132 with a precisely true center hole for the shaft as the single bearing will have some slop and tolerance and eccentricities will be accommodated by the biased support wheel.

Preferably, the core sections 110a–110c and the like would be cut from the preformed Aeroweb® honeycomb sheet of the type previously noted. Initially, long straight sides of the core material would be cut forming a pie-shaped wedge. The wedge would preferably be mounted in a pie-shaped rotating jig for a major radius cut. The pointed end of the wedge would be removed with a straight transverse cut before or after the radius cut. Slots may be cut at any time in the long straight sides of each core segment 110a–110c.

Figure 11:
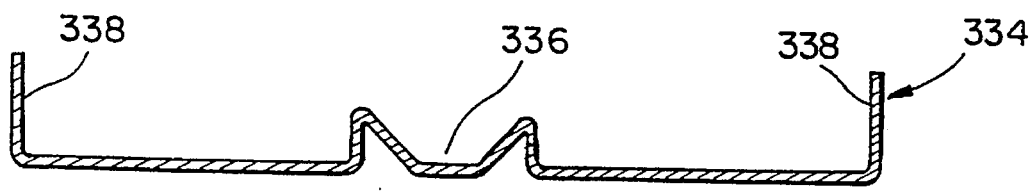

FIG. 10 shows a cross section of a different rim embodiment 234 having a track 236 and sealing flanges 238, which is suitable for extrusion or molding. The extreme distal ends of the seal flanges 238 are inwardly tapered to their tips. This eases installation and removal of the wheel and minimizes damage to the flexible seals, which are positioned to contact the straight sides of the seal flanges radially inward of the taper. FIG. 11 shows a cross section of yet another rim 334 with integral track 336 and seal flanges 338, having a geometry particularly suitable for fabrication by conventional sheet metal bending technologies, for example in galvanized or stainless steel.

FIG. 12 discloses yet another roller embodiment 242 in which the bearing portion 243 of the wheel is supported on a hollow tube portion 244 that is rotatably supported on bearings 245 on an axle 246 extending between the major opposing outer walls 40 of a housing 38.

Figure 13:
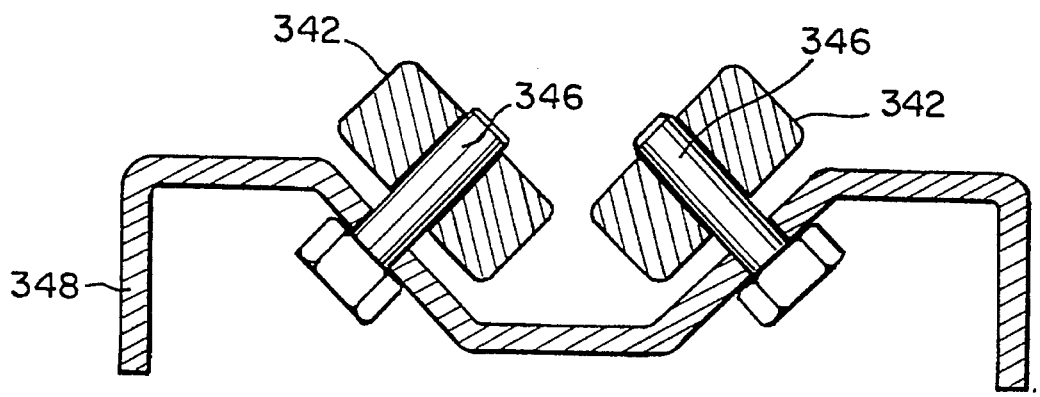
FIG. 13 is a partially cross-sectional elevation of an alternate dual roller embodiment.

FIG. 13 shows a dual support wheel design in which a pair of wheels 342 are rotatably supported on a pair of axles 346 each of which is supported at one end by a suitably configured mounting plate 348, which again could be coupled to or form part of a frame of a housing 38.

Figure 14:
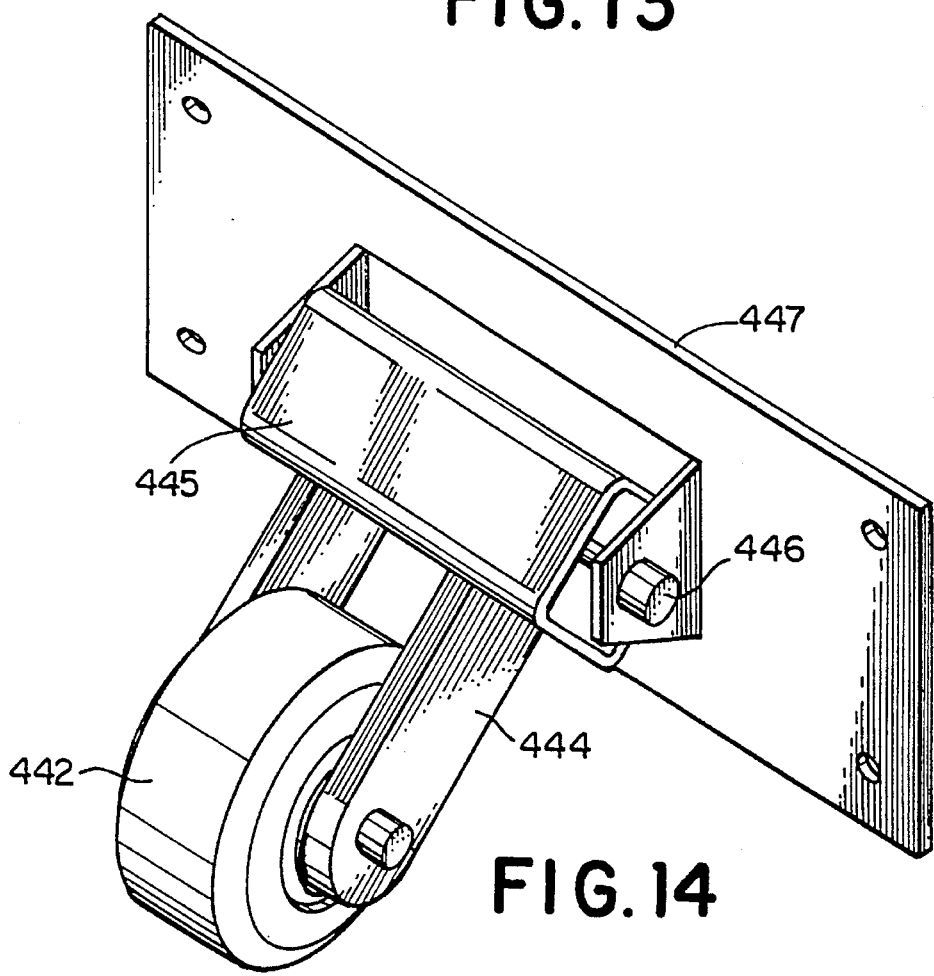
FIG. 14 is a perspective of an alternate spring biased roller embodiment.

FIG. 14 shows an alternative spring loaded roller construction in which a support wheel 442 is mounted by means of a yoke 444 having a hollow base 445 mounted to pivot in an axle 446 provided on a mounting plate 447 which may be attached to or used as a portion of the frame of the housing. A torsional spring (not depicted) within the hollow base reacts with the axle 446 and/or mounting plate 447 to bias the wheel 442 against a regenerative fluid treatment wheel.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. The assembly of claim 3 wherein the pair of seal flanges are integral with the rim.

2. The assembly of claim 5 wherein the housing includes a pair of opposing outer walls with openings there-through at least generally axially aligned with the core of the treatment wheel and further comprising flexible seals mounted on the housing surrounding each opening and positioned to contact the seal flanges of the treatment wheel.

3. A rotatably supported regenerative fluid treatment wheel assembly comprising:

a regenerative fluid treatment wheel having a core porous in an axial direction and a circular rim surrounding and secured with the core;

a track on the treatment wheel encircling the treatment wheel;

a housing surrounding the treatment wheel;

a plurality of rollers disposed within the housing in rolling engagement with the track; and a pair of seal flanges extending at least generally radially from the treatment wheel around the circumference of the treatment wheel proximal each of two major opposing axial faces of the air treatment wheel;

wherein the housing includes a pair of opposing outer walls with openings there- through at least generally axially aligned with the core of the treatment wheel and further comprising flexible seals mounted on the housing surrounding each opening and positioned to contact the seal flanges of the treatment wheel; and wherein each of the seals is releasably clipped to an edge of one of the pair of opposing outer walls defining one of the openings.

4. The assembly of claim 3 further comprising an abrasion resistant layer adhered to one of the flexible seals at a location directly opposite and facing the proximal seal flange of the treatment wheel.

5. A rotatably supported regenerative fluid treatment wheel assembly comprising:

a regenerative fluid treatment wheel having a core porous in an axial direction and a circular rim surrounding and secured with the core;

a track on the treatment wheel encircling the treatment wheel;

a housing surrounding the treatment wheel;

a plurality of rollers disposed within the housing in rolling engagement with the track; and a pair of seal flanges extending at least generally radially from the treatment wheel around the circumference of the treatment wheel proximal each of two major opposing axial faces of the air treatment wheel, wherein at least a portion of each seal flange distal to the core tapers generally axially inwardly as the seal flange extends away from the core.

6. A rotatably supported regenerative fluid treatment wheel assembly comprising:

a regenerative fluid treatment wheel having a core porous in an axial direction;

a pair of seal flanges extending at least generally outwardly from the treatment wheel around the outer circumference of the treatment wheel proximal each of two major opposing axial sides of the wheel;

a housing surrounding the treatment wheel, the housing including a pair of opposing outer walls with openings therethrough, at least generally axially aligned with the core of the treatment wheel; and flexible seals releasably clipped on the housing surrounding each opening, each seal positioned to contact one of the seal flanges of the treatment wheel.

7. The assembly of claim 3 wherein the track, seal flanges and rim are formed by portions of a one-piece extrusion.

8. The assembly of claim 4 wherein the abrasion resistant layer is a flexible tape adhered to the one of the flexible seals.

9. The assembly of claim 3 wherein each of the seals includes a resiliently flexible clip portion having an open channel receiving and releasably engaging with the edge of one of the walls.

10. The assembly of claim 5 wherein the pair of seal flanges are integral with the rim.

11. The assembly of claim 6 wherein the pair of seal flanges are integral with a circular rim surrounding and secured with the core.

12. The assembly of claim 6 further comprising an abrasion resistant layer adhered to one of the flexible seals at a location directly opposite and facing the proximal seal flange of the treatment wheel contacted by the one flexible seal.

13. The assembly of claim 6 wherein at least a portion of each seal flange distal to the core tapers generally axially inwardly as the seal flange extends away from the core.

* * * * *